United States Patent
Joshi et al.

(10) Patent No.: US 7,324,354 B2
(45) Date of Patent: Jan. 29, 2008

(54) POWER SUPPLY WITH A DIGITAL FEEDBACK LOOP

(75) Inventors: Rahul Joshi, Pleasant Hill, CA (US); Don Hutson, El Cerrito, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 11/428,948

(22) Filed: Jul. 6, 2006

(65) Prior Publication Data
US 2007/0008745 A1    Jan. 11, 2007

Related U.S. Application Data

(60) Provisional application No. 60/697,869, filed on Jul. 8, 2005.

(51) Int. Cl.
*H02M 3/335* (2006.01)
(52) U.S. Cl. .............. 363/17; 363/61; 363/98
(58) Field of Classification Search .......... 363/17, 363/61, 89, 95, 98
See application file for complete search history.

(56) References Cited

U.S. PATENT DOCUMENTS

| | | | | |
|---|---|---|---|---|
| 4,035,710 A | * | 7/1977 | Joyce | 363/37 |
| 4,533,986 A | * | 8/1985 | Jones | 363/17 |
| 4,686,615 A | * | 8/1987 | Ferguson | 363/17 |
| 4,761,722 A | * | 8/1988 | Pruitt | 363/17 |
| 6,344,986 B1 | * | 2/2002 | Jain et al. | 363/89 |
| 6,556,462 B1 | * | 4/2003 | Steigerwald et al. | 363/89 |
| 6,650,552 B2 | * | 11/2003 | Takagi et al. | 363/17 |
| 6,842,353 B2 | * | 1/2005 | Yamada et al. | 363/89 |
| 6,927,985 B2 | * | 8/2005 | Klinkowstein | 363/17 |

* cited by examiner

*Primary Examiner*—Jeffrey Sterrett
(74) *Attorney, Agent, or Firm*—Townsend and Townsend and Crew LLP

(57) ABSTRACT

A wide range power supply capable of delivering 20V to 5000V is provided. The power supply of the present invention uses switch mode technology to achieve high overall operating efficiency and is capable of operating from no load to full load without loss of regulation. The power supply in accordance with the embodiments of the present invention operates directly from the utility supply (e.g., 110V/220V and 50 Hz/60 Hz). In one embodiment, the power supply's power conversion stage includes the following stages: an input rectifier; a buck converter; a quasi-resonant inverter; and a voltage multiplier. The above indicated stages are connected in series to achieve the large output voltage range. High precision is obtained from a use of a digital feedback loop, possibly in connection with an analog feedback loop.

21 Claims, 11 Drawing Sheets

POWER SUPPLY WITH A DIGITAL FEEDBACK LOOP

CROSS REFERENCES TO RELATED APPLICATIONS

The present application claims the benefit of earlier filed provisional application U.S. Ser. No. 60/697,869, entitled "WIDE RANGE POWER SUPPLY FOR PROTEIN ELECTROPHORESIS, ISOELECTRIC FOCUSING AND ELECTROPHORETIC BLOTTING," filed on Jul. 8, 2005, the entire content of which is incorporated by reference.

BACKGROUND OF THE INVENTION

The present invention is related to power supply systems, and more specifically to wide range power supply devices. Such devices are used, for example, in protein electrophoresis, isoelectric focusing, DNA sequencing, and electrophoretic blotting.

Protein electrophoresis and isoelectric focusing demand power supplies that meet diverse requirements of delivering voltages from less than 20V to several kilovolts. Thus, these power supplies may be termed wide range power supplies. These power supplies also need to be efficient and able to perform in different modes such as the constant voltage, constant current, constant power, timed modes, and constant volt hour modes.

Current power supply configurations are impractical for achieving voltages as high as 5000V and do not provide high precision in the output voltage. For example, power supplies that use a flyback transformer require multiple windings whose outputs are rectified and connected in series to achieve high voltages. The many windings required for such high voltages create a bulky and expensive power supply. A flyback configuration, as well as other switching power supplies, also suffer from high electromagnetic interference (EMI) as follows.

For reasons of efficiency, size weight and cost, switch mode power conversion is a standard design. Switching power supplies generate EMI as a result of electric currents being switched at high frequencies. Regulatory requirements demand that this noise level be below certain prescribed guidelines to ensure that electronic equipment does not affect operation of other equipment in the vicinity. The magnitude of this EMI generated depends on the switching mechanism employed.

Hard-switched flyback converters have sharp rising and falling edges on the voltage waveforms and pulsating current waveforms, which generate relatively higher EMI. Thus, increased filtering is needed, which results in a higher cost of the end product. Also, the large number of windings on a flyback transformer causes poor coupling of magnetic flux between the primary and the secondary windings. This results in a higher leakage flux, which requires the additional cost of higher radiated EMI filtering. Running at high power, flyback transformers also generate relatively higher common mode EMI, which reduces efficiency of the power conversion stage.

The precision of current power supply configurations is also limited by the current switching and regulation mechanisms. For example, in a conventional architecture the power converter control is prone to time and temperature drift. Additionally, galvanic isolation of input and output is a design need so as to meet product safety and regulatory requirements, and current feedback patterns within using isolation circuitry produce offset errors and non-linearities.

Therefore, it is desirable to provide methods, apparatus, and systems for efficiently supplying wide voltage ranges with high precision and reliability.

BRIEF SUMMARY OF THE INVENTION

Accordingly, embodiments of the present invention provide methods, apparatus, and systems capable of delivering from less than 20V to more than 5000V. A power supply in accordance with the embodiments of the present invention uses switch mode technology to achieve high overall operating efficiency and is capable of operating from no load to full load without loss of regulation. The power supply in accordance with the embodiments of the present invention operates directly from the utility supply (e.g., 110V/220V and 50 Hz/60 Hz).

In one exemplary embodiment of the present invention, a wide range power supply device for protein electrophoresis, isoelectric focusing and electrophoretic blotting is provided. The power supply's power conversion stage includes: an input rectifier; a dc/dc converter; a resonant inverter; and a voltage multiplier. The above indicated stages are connected in series to achieve the large output voltage range. The power supply includes a power supply controller operatively coupled with the dc/dc converter and the resonant inverter. The power supply controller is coupled with the output voltage via one or more feedback loops.

The dc/dc converter may be a buck converter, a buck-boost converter, or other suitable dc/dc converter. The resonant inverter may be a quasi-resonant inverter, which can have different designs, such as a half-bridge or an H-bridge. Also, other inverters may be used, such as resonant pole inverters, resonant dc link inverter, or resonant snubber inverters. One embodiment of the present invention uses a transformer with single secondary winding and smooth waveforms due to resonant switching which generate relatively lower EMI and hence reduce the cost of EMI filter network employed. In another embodiment, the voltage multiplier also acts as a rectifier of a signal from the transformer.

In one embodiment, the wide range power supply device also includes a supervisory controller operatively coupled with the power supply controller. The coupling is accomplished with an optically isolated digital interface. The supervisory controller may be part of one of the feedback loops. In this embodiment, the supervisory controller sends a digital signal to the power supply controller. The digital signal may include information as to an error in the output voltage, and the information may include a new voltage setting for the power conversion stage.

In another embodiment, the wide range power supply device includes an analog optocoupler, where the analog optocoupler is part of an analog feedback loop from the output voltage to the power supply controller.

In another exemplary embodiment of the present invention, a method for controlling an output voltage of a switched-mode power supply is provided. A first set point is received at a power supply controller. A set point includes an output voltage setting. The output voltage is generated via control signals sent by the power supply controller to a power conversion stage. In one embodiment, the control signals are PWM signals. An input of the power conversion stage is galvanically isolated from the output voltage. The output voltage is measured with a supervisory controller.

An error in the output voltage is calculated with the supervisory controller using the output voltage and a reference voltage. A digital signal is transmitted from the supervisory controller to the power supply controller based on the error. The supervisory controller is galvanically isolated from the power supply controller. The control signals are altered based on the digital signal, which can achieve a higher precision voltage setting for the power supply. In one embodiment, the digital signal is transmitted through a digital optocoupler, where the digital optocoupler provides galvanic isolation between the power supply controller and supervisory controller.

In another embodiment, the method also includes transmitting, via an analog signal, the output voltage to the power supply controller, and using the analog signal in a feedback loop to alter the control signals to the power conversion stage. The digital signal may include a second set point, which includes a new voltage setting that compensates for the error in the output voltage from the desired voltage. The analog signal may be transmitted through a linear optocoupler, where the linear optocoupler provides galvanic isolation between the output of the power supply and the power supply controller.

In yet another embodiment, the method also includes receiving the first set point at a control board processor; sending the first set point to the supervisory controller; and digitally sending the first set point to the power supply controller.

In another exemplary embodiment of the present invention, a wide range power supply device is provided. This power supply has a power conversion stage, a power supply controller, and a supervisory controller. The power supply controller is operatively coupled with the power conversion stage, and is coupled with an output voltage of the wide range power supply via one or more feedback loops. The supervisory controller is operatively coupled with said control processor. The coupling is accomplished with an optically isolated digital interface, and the supervisory controller is part of one of the feedback loops.

In one embodiment, the supervisory controller sends a digital signal to the power supply controller. The digital signal includes information as to an error in the output voltage. The information may include a new voltage setting for the power conversion stage.

In yet another exemplary embodiment of the present invention, a power supply in accordance with embodiments of the present invention uses a fully digital control architecture. Control is achieved through a power supply controller, which may be a digital signal processor (DSP). The digital architecture enables the control to adapt to the changing load conditions. In a conventional architecture where the power converter control is analog and the supervisory functions are controlled by a microprocessor, the converter control is prone to time and temperature drift. The pure digital architecture makes the control system generally time and temperature invariant. In one embodiment, the control architecture uses three processors. The three processors use an optically isolated interface to communicate using a unique protocol for communication that enables reliable operation in a noisy environment such as a switching power supply.

The following detailed description together with the accompanying drawings will provide a better understanding of the nature and advantages of the present invention.

DETAILED DESCRIPTION OF THE INVENTION

Embodiments of the present invention provide a wide range power supply capable of delivering 20V to 5000V. The power supply in accordance with the embodiments of the present invention uses switch mode technology to achieve high overall operating efficiency and is capable of operating from no load to full load without loss of regulation. The power supply may operate directly from the utility supply (e.g., 110V/220V and 50 Hz/60 Hz).

Unless defined otherwise, all technical and scientific terms used herein have the meaning commonly understood by a person skilled in the art to which this invention pertains. As used herein, the following acronyms are defined as follows: constant current (CC); constant voltage (CV); constant power (CP); power factor correction (PFC); analog to digital converter (ADC); pulse width modulation (PWM); liquid crystal display (LCD); resistor capacitor series circuit (RC-circuit); inductor-capacitor (LC), digital signal processor (DSP), and electromagnetic interference (EMI).

Figure 1:
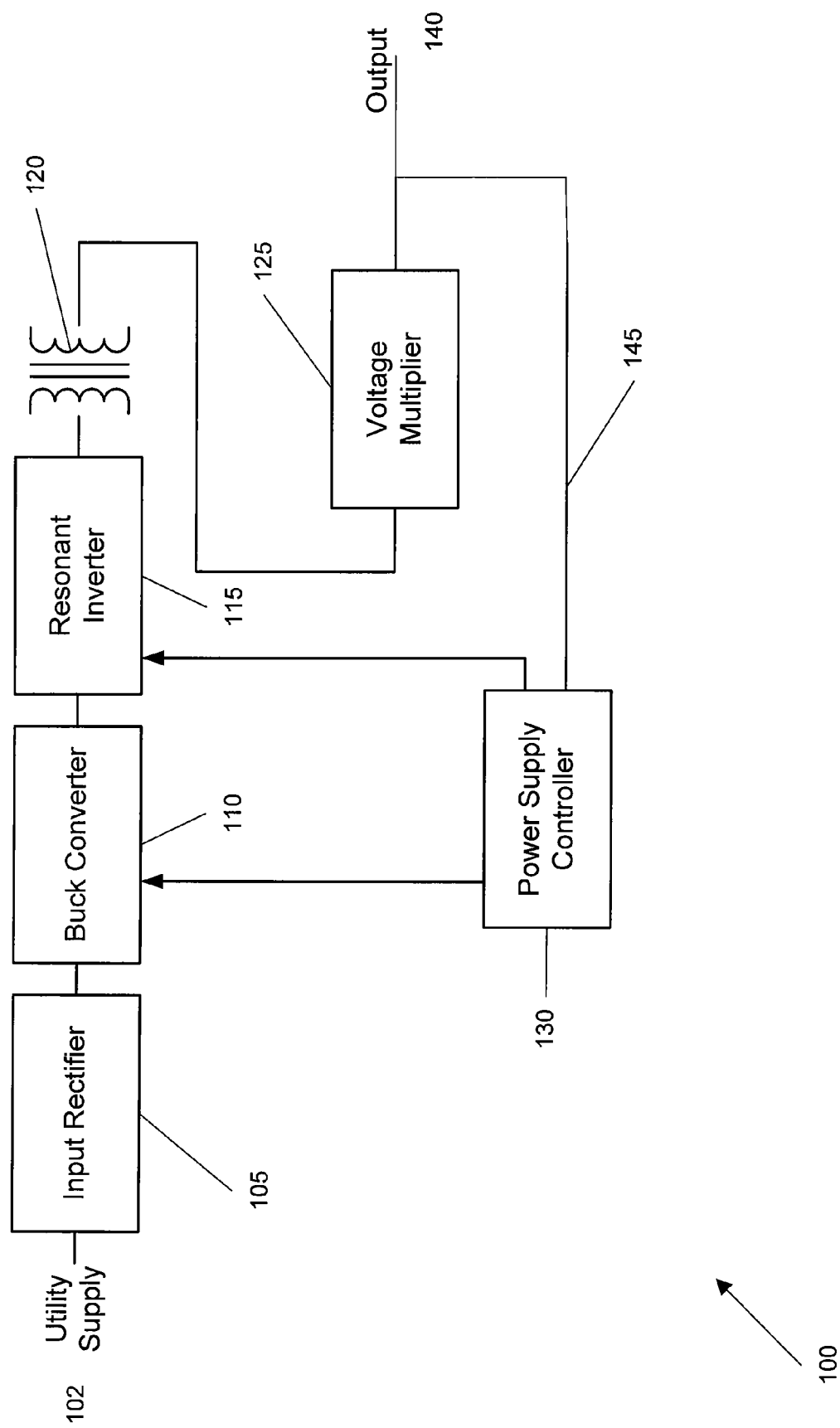
FIG. 1 is an exemplary simplified block diagram of a power supply in accordance with the embodiments of the present invention.

FIG. 1 shows an exemplary simplified block diagram 100 of a power supply in accordance with the embodiments of the present invention. As shown in FIG. 1, the power supply's power conversion stage includes the following elements an input rectifier 105; a buck converter 110; a resonant inverter 115; a transformer 120, and a voltage multiplier 125. These stages are connected in series to achieve the large output voltage range. The operation of the power supply is controlled by a power supply controller 130 to generate the desired output 140. Power supply controller 130 receives a feedback signal 145, which may be accomplished through optocouplers for isolation of the input and output of power supply 100. In one embodiment, power supply controller 130 is a digital signal processor (DSP).

Input rectifier 105 rectifies an input utility supply AC voltage 102 to an un-regulated DC voltage. In one embodiment, the rectifier is a full wave rectifier. In other embodiments, a half-wave or other type of rectifier may be used. The rectifier may also act as a voltage doubler.

Buck converter 110 receives the un-regulated DC voltage from input rectifier 105 and produces a variable DC voltage, e.g. from 1V to 195V. Depending on the application, other embodiments may utilize other DC/DC converters, such as a buck-boost converter. If low voltages are not desired, a boost converter may be used as well. The output voltage of the buck converter is regulated by power supply controller 130 in accordance with preset values or dynamically based on output 140.

In one embodiment, power supply controller 130 controls buck converter 110 with PWM signals, e.g. by regulating the duty cycle of the PWM signal. As the output of rectifier 105 is unregulated, buck converter 110 allows a higher precision DC voltage to be generated. This higher precision DC voltage allows greater precision in the output 140. In one embodiment, the operating frequency of buck converter 110 may be changed to improve the precision of control. This improvement in precision may particularly be useful for very light loads.

Figure 2:
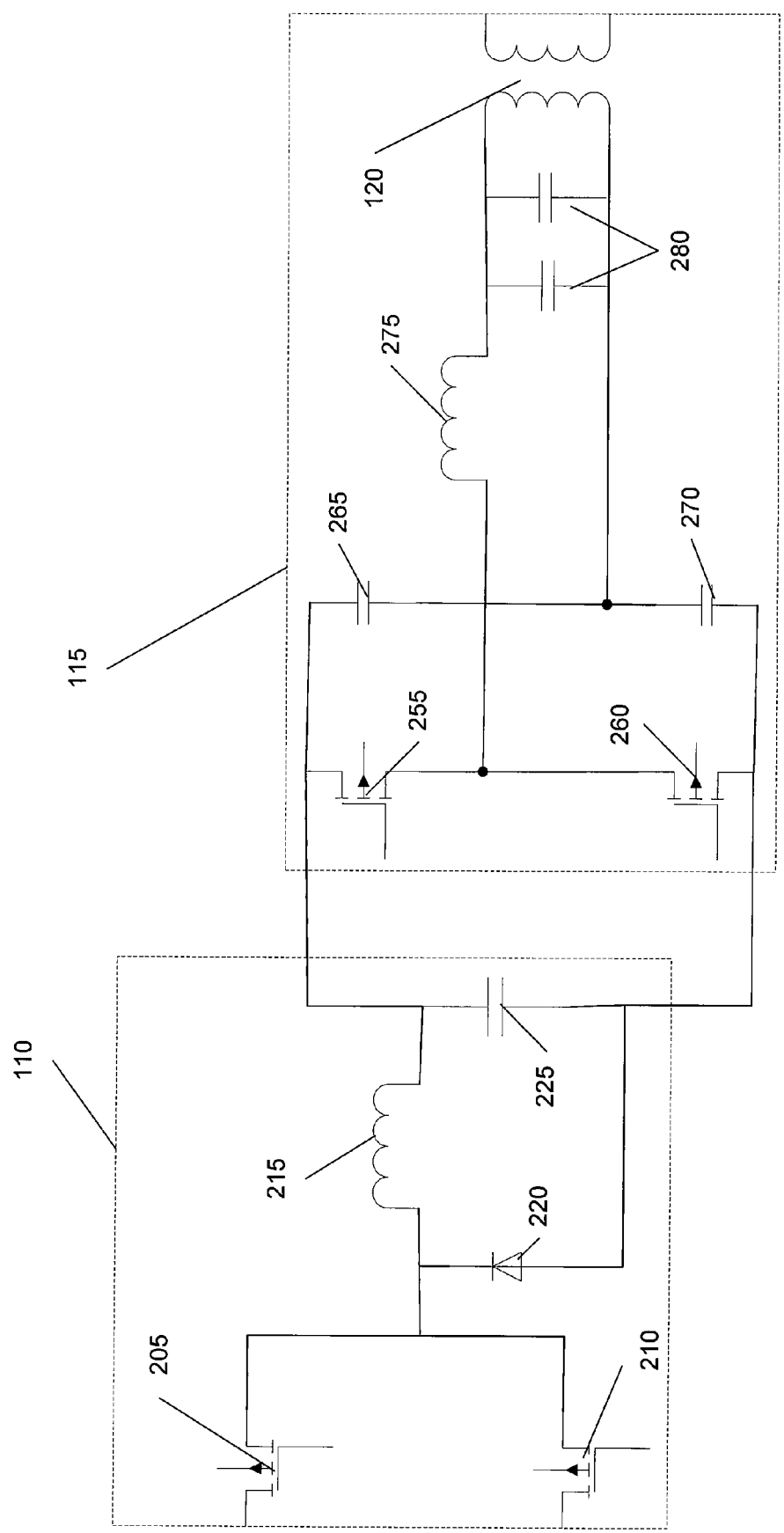
FIG. 2 shows a schematic of a switching circuit of a power supply in accordance with the embodiments of the present invention.

FIG. 2 shows a schematic of buck converter 110 according to an embodiment of the present invention. In FIG. 2, two switches 205 and 210 are used in buck converter 110. In other embodiments, one switch or more than two switches may be used. The switches may be MOSFETs, such as IRFPE50 made by International Rectifier, or another suitable switching device. A free wheeling diode 215 is connected after the switches and before a series combination of an inductor 220 and output filter capacitor 225. In one aspect, output filter capacitor 225 has a capacitance of about 100 uF (400V) and inductor 220 has an inductance of about 2.5 mH. In another aspect, the buck converter operates at 100 kHz switching frequency by alternately switching MOSFET's 205 and 210. These stated values for the components help to provide the desired range of voltage output by the power supply.

Resonant inverter 115 receives the regulated DC voltage from buck converter 110 and produces an alternating and relatively smooth waveform. The inverter may be quasi-resonant in that switching takes place at approximately zero current to reduce EMI and switching losses. In one embodiment, quasi-resonant inverter 115 is a variable frequency half-bridge inverter configuration which is operated at a frequency above the resonant frequency. The frequency of resonance may be determined by the load impedance, values of an LC filter at the output of the inverter, and/or other passive components connected at the output of the inverter.

FIG. 2 shows a schematic of resonant inverter 115 according to an embodiment of the present invention. In this embodiment, resonant inverter 115 is a half-bridge quasi-resonant inverter. In FIG. 2, two switches 255 and 260 are used to create an AC signal. The switches may be MOSFETs, such as SPW47N60C3 made by Infenion Semiconductor, or other suitable switching device. In one aspect, resonant inverter capacitors 265 and 270 are about 0.047 uF (1600V). Switch 255 and capacitor 265 are connected with one side of output filter capacitor 225 of buck converter 110. Switch 260 and capacitor 270 are connected with the other side of output filter capacitor 225. Note that other circuit elements may occur between buck converter 110 and resonant inverter 115 as well as within themselves.

A line between the switches 255 and 260 is connected with one end of the resonant inverter output filter and another line between the capacitors 265 and 270 is connected with the other end of the filter. In one aspect, the resonant inverter output filter is composed of an inductor 275 of about 70 uH and two capacitors 280, which are each about 0.0091 uF (2500V). Other configurations may be used, such as an H-bridge inverter. In other embodiments, other inverters may be used, such as resonant pole inverters, resonant dc link inverter, or resonant snubber inverters. A half-bridge inverter is very efficient in terms of component count as it only needs two active switches. These stated values for the components help to provide the desired range of voltage output by the power supply.

In one embodiment, inductor 275 is made using a EE56/24/19 ferrite core and the core material is 3C94 made by Ferroxcube inc., which offers low losses at high frequencies. In one aspect, inductor 275 has an air gap in the centre leg and is made using 20 turns of 14AWG Teflon insulated multistrand wire, which is made up of 110 strands of 36 AWG wires. The multistrand construction helps to reduce losses due to skin effect.

The resulting waveform from the quasi-resonant inverter 115 may be controlled by power supply controller 130 through PWM signals. The PWM signals can affect properties of the resulting waveform, such as voltage and frequency. Power supply controller 130 generates pulses such that the active switches turn ON and OFF alternately for equal amount of time. Thus, the frequency of the pulses may change, which alters the frequency of operation and of the resulting waveform. In one embodiment, the duty cycle (ratio between on time and total period of the pulse) is not changed, but the time period is changed by the power supply controller 130, which results in a change of frequency of operation of the inverter. In this manner, additional control and precision over the output 140 is achieved. In one embodiment, the resulting waveform is sinusoidal or sinusoidal-like.

In another embodiment, the output voltage of the waveform from resonant inverter 115 is controlled by the frequency of the PWM signals. A resonant inverter will have the highest gain, i.e. produce the highest output, when operated at or near the resonant frequency. The higher the frequency above the resonant frequency, the lower the output voltage produced. Hence, the resonant inverter can be made to produce low or high output voltage signals by varying its operating frequency. To achieve a wide operating range, resonant inverter 115 may be operated at a frequency between about 200 KHz and the resonant frequency. The frequency of resonance changes with loading; however, typical values are in the range of 60 kHz to 130 kHz.

The output of resonant inverter 115 is coupled to a step up isolation transformer 120. As the waveform input into transformer 120 is relatively smooth, the amount of EMI is minimized. The smooth waveform also reduces losses in elements handling that current and voltages, such as eddy current losses in wound components like inductors or transformers. In one embodiment, transformer 120 has only one secondary winding. In another embodiment, transformer 120 is a high frequency transformer such that its size is minimized while still achieving a desired amplification. As the waveform from resonant inverter 115 is frequency dependent, the amplification of transformer 120 may be controlled via the operating frequency of resonant inverter 115. In one embodiment, the transformer is made using a low loss ferrite core and uses multi strand wires for primary and secondary to reduce losses due to skin effects.

In one embodiment, transformer 120 is wound on an EE42/21/20 ferrite core and has an 8 turn primary and 34 turn secondary giving it a transformation ratio of 1:4.25. The wire used for primary and secondary may be a 20 AWG multi strand wire, which is made up of 20 strands of 34 AWG wire. Also, the primary may be wound between two halves of the secondary to provide superior coupling between windings and to reduce leakage reactance of the windings.

Step-up transformer 120 is coupled to a voltage multiplier 125, which multiplies the output voltage from transformer 120. The multiplication factor of this multiplier is a function of the load connected at the output of this stage, which is also the load connected to the output of the power supply. In one embodiment, an automatic reduction of the multiplication factor with increasing load is achieved by appropriate selection of capacitor values in the multiplier chain. In one embodiment, voltage multiplier 125 also rectifies the signal from transformer 120 to obtain a final DC signal as the final output 140.

Figure 3:
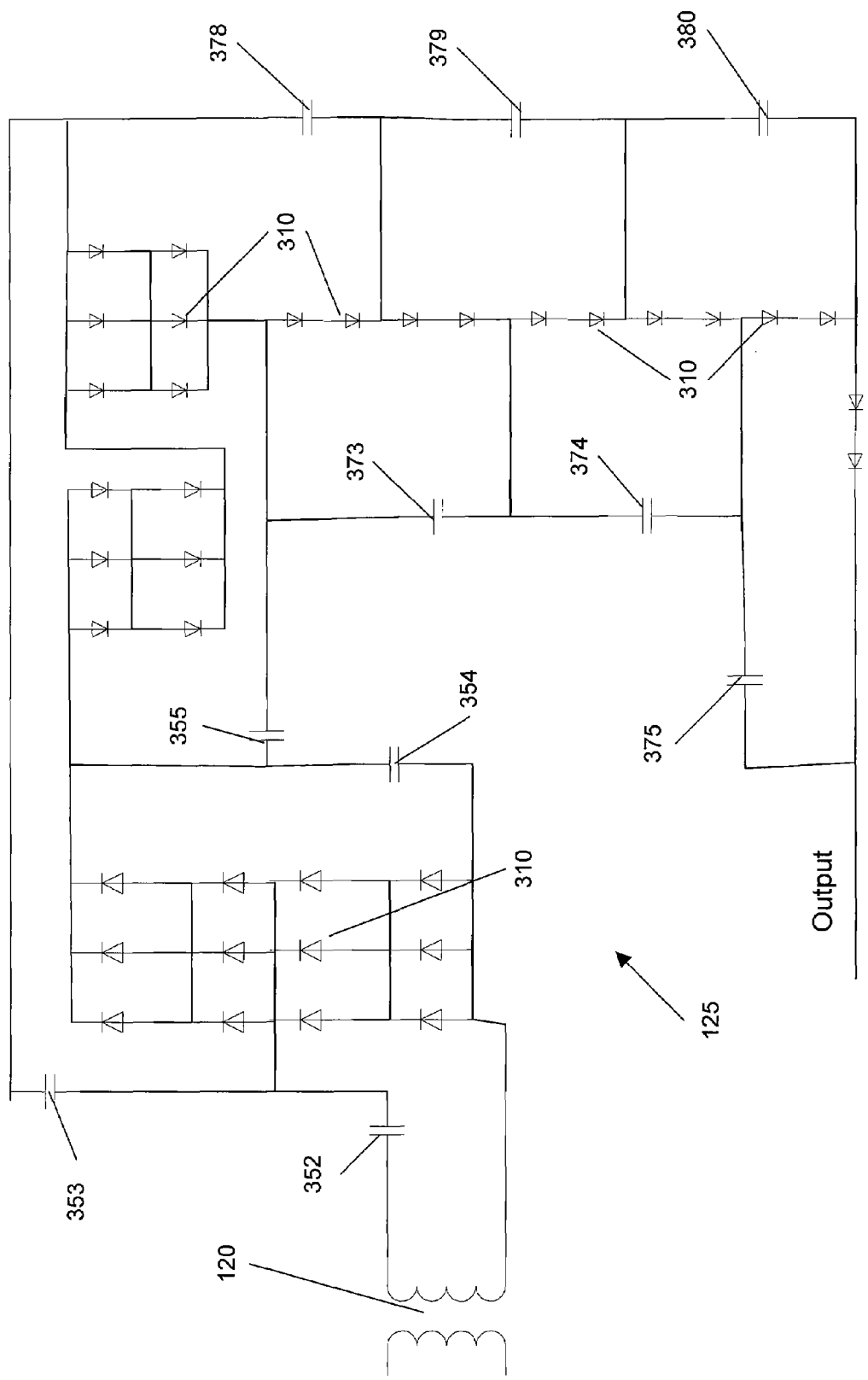
FIG. 3 shows a schematic of a voltage multiplier circuit of a power supply in accordance with the embodiments of the present invention.

FIG. 3 shows a schematic of voltage multiplier 125 according to an embodiment of the present invention. In one embodiment, capacitors have the following approximate values: 352-0.033 uF 800V; 353-0.01 uF 1600V; 354-0.47 uF 2000V; 355-0.22 uF 2000V; 373-0.047 uF 2000V; 374-0.022 uF 2000V; 375-0.022 uF 2000V; 378-0.0047 uF 1600V; 379-0.001 uF 1600V; and 380-560 pF 2000V. In one embodiment, diodes 310 are UF5408 diodes. The diodes and the capacitors provide an amplified DC signals at output 140.

Multiplier 125 is a 5-stage multiplier. With the capacitor values as selected above, a multiplication factor of 5 is achievable only with load currents less than 25 mA at output. For load currents in excess of 25 mA the output of the multiplier falls exponentially to provide a multiplication ratio of 2 at output current equals 500 mA.

A resonant circuit can theoretically produce a voltage, which is infinite at resonance. Practically however the gain of a resonant circuit is a function of the losses in the components comprising the LC resonant circuit and the value of the load connected to the resonant circuit. In one aspect, LC resonant circuit is inductor 275 and capacitors 280. The "Q" of the circuit is lowered with increased load on the output. In one embodiment, the effective value of "C" consists of capacitors 280 and the capacitance of voltage multiplier 125 as reflected back to the primary. In one aspect, values of the circuit elements are selected to ensure that the resonance frequency is approximately 75 kHz with full load at output (800V at output and 500 mA output current). Power supply controller 130 can start operation at 200 kHz but will reduce the frequency gradually to a value closer to the resonance frequency to regulate output voltage as the load current at output goes up and vice versa.

In order to maintain a desired voltage, power supplies use an analog feedback loop. For example, feedback loops may carry a voltage representing the difference between the actual output voltage and the desired output voltage. To meet product safety and regulatory requirement, galvanic isolation of input and output is a design is needed. Optocouplers, such as linear optocouplers, are typically used for this feedback control of output voltage. This is an analog communication. Using optocouplers (optoisolators) for transferring analog signals is prone to and inaccuracy due to optocoupler non-linearities, time drift, and temperature drift. In order to alleviate these errors, embodiments of the present invention use digital communication for at least part of a feedback loop.

Figure 4:
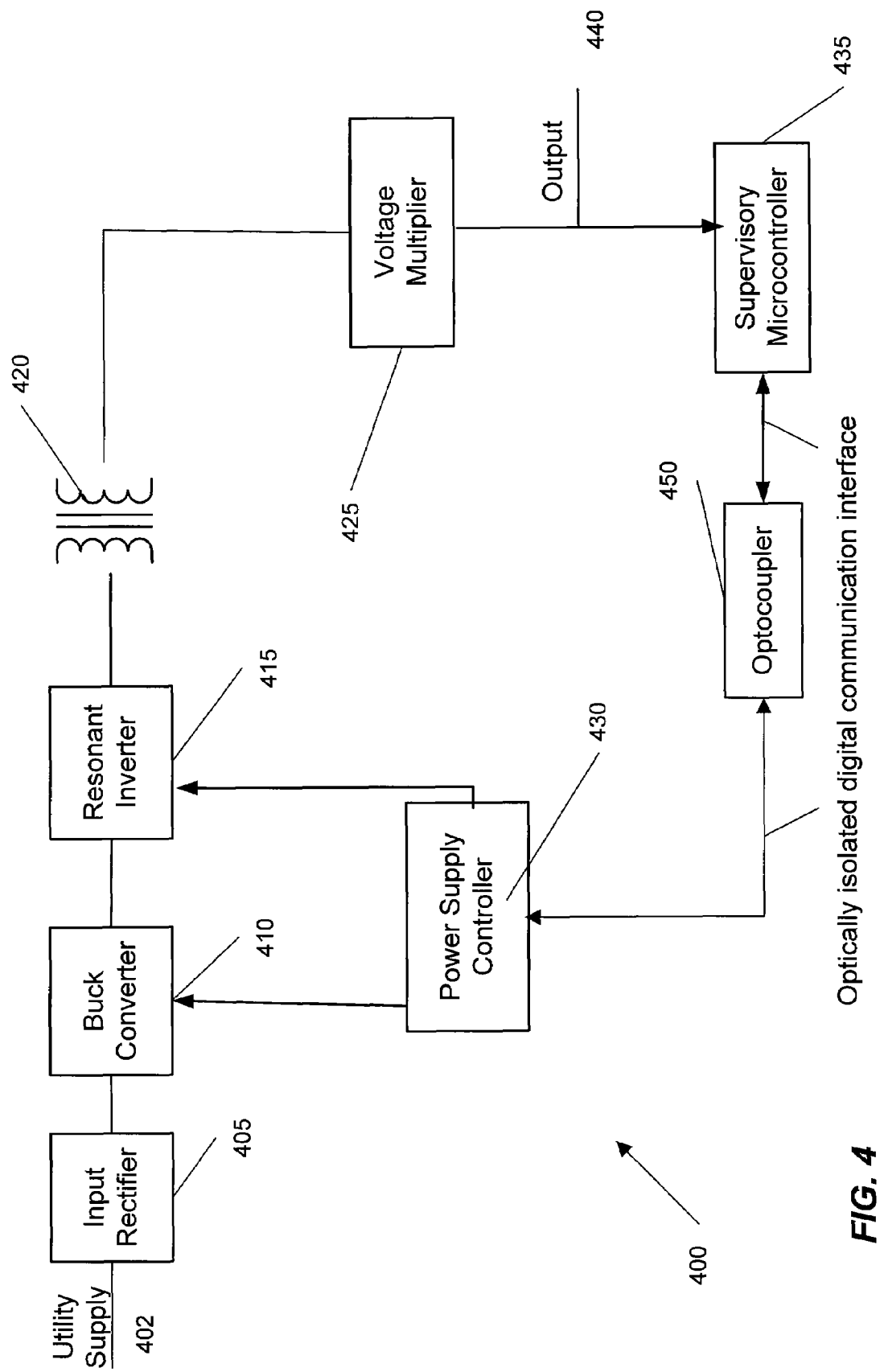
FIG. 4 is an exemplary simplified block diagram of a power supply utilizing a digital feedback loop in accordance with the embodiments of the present invention.

FIG. 4 shows an exemplary simplified block diagram 400 of a power supply in accordance with the embodiments of the present invention. Power supply 400 has a power conversion stage including an input rectifier 405; a buck converter 410; a resonant inverter 415; a transformer 420, and a voltage multiplier 425. These stages are connected in series to achieve the large output voltage range. The operation of the power supply is controlled, in part, by a power supply controller 430 to generate the desired output 440. In other embodiments, buck converter 410 and resonant inverter 415 may be replaced with a more traditional power supply configuration, such as a flyback topology. Additionally, voltage multiplier 425 may act only as a rectifier or other AC to DC converter.

In the embodiment of FIG. 4, a portion of a feedback loop is accomplished via a supervisory controller 435 and optocouplers 450. In other embodiments, additional feedback loops may be used. Supervisory controller 135 provides instructions to power supply controller 430. Such instructions may include the set point (voltage setting) for which the power supply controller 430 is to operate. Supervisory controller 135 also monitors for fault conditions and is responsible to shutdown power supply controller 430 in case of a fault at output. The communication between controllers 430 and 435 is a digital communication as optocouplers 450 handle a digital signal. Note that these controllers are on opposite sides of the isolation boundary.

In one embodiment, supervisory controller 435 is connected electrically to the output side of the power supply, makes a precision measurement, and uses a temperature stable precision reference to calculate an error in the output voltage. Supervisory controller 435 can send the signal digitally to the power supply controller 430, which alters the PWM signals based on the communication from supervisory controller 435.

The digital communication helps to eliminate the non-linearities, time drift, and temperature drift problems of transferring an analog signal. The digital signal also helps to prevent errors from noise. Analog Signals are communicated as analog voltage levels. Any noise superimposed would mean a different analog value. Digital signals on the other hand are communicated as a combination of high and low levels representing a "1" and a "0". As long as the noise does not change the voltage level drastically, the signal is interpreted by the receiving end correctly. Also, embodiments may incorporate additional checking for the number of bits received in a given time frame and for correctness of range of the values received. If a failure of a value to be in range is detected, all or parts of the transmission may be repeated, for example, by communicating reception error codes. In one embodiment, supervisory controller 435 is or functions as an analog to digital converter.

Figure 5:
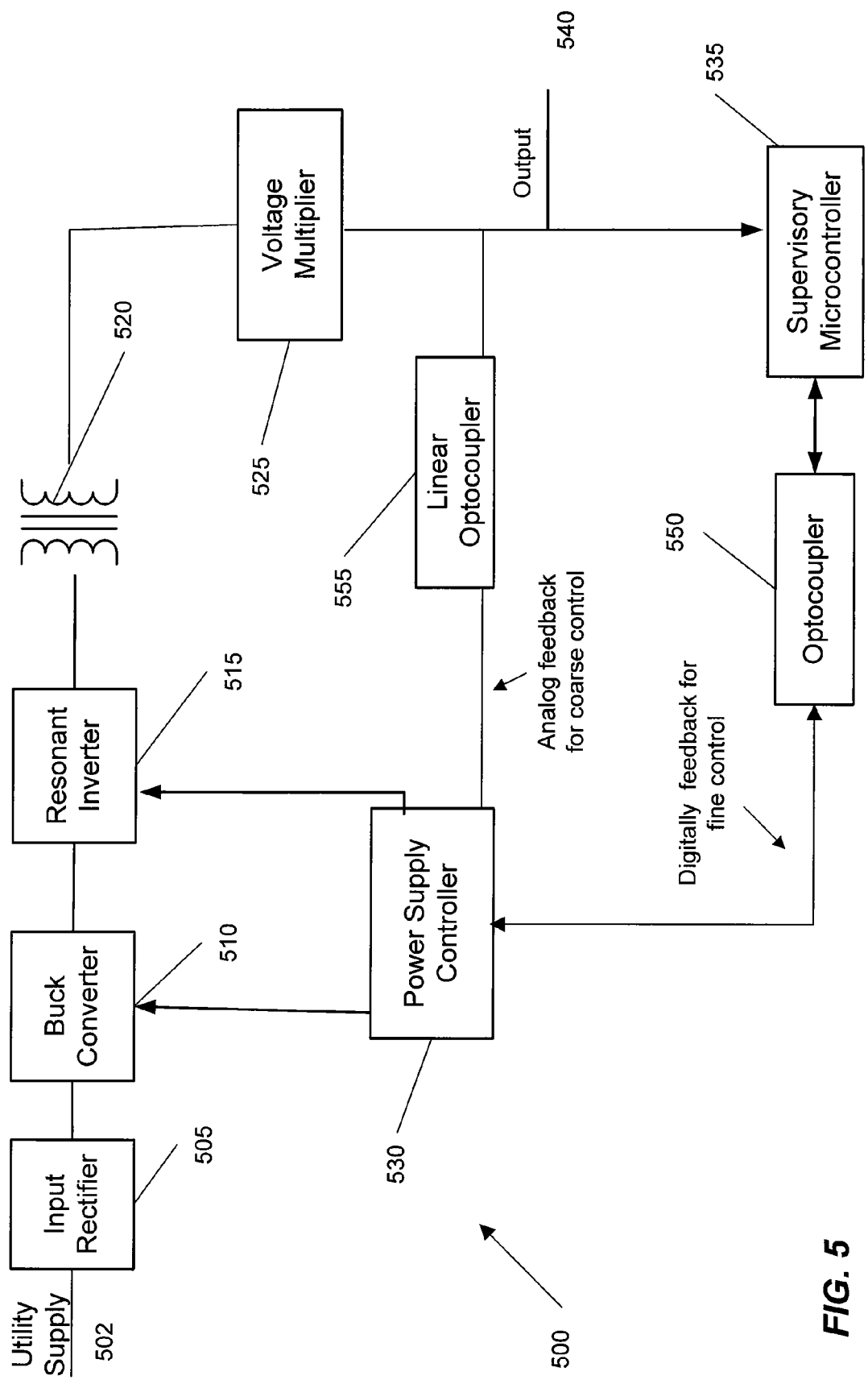
FIG. 5 is an exemplary simplified block diagram of a power supply utilizing a hybrid feedback loop in accordance with the embodiments of the present invention.

A hybrid feedback scheme that uses an analog loop and a digital loop is also provided. FIG. 5 shows an exemplary simplified block diagram 500 of a power supply in accordance with the embodiments of the present invention. Power supply 500 has a power conversion stage including an input rectifier 505; a buck converter 510; a resonant inverter 515; a transformer 520, and a voltage multiplier 525. The operation of the power supply is controlled by a power supply controller 530 and a supervisory controller 535 to generate the desired output 540.

In one embodiment, the power supply controller 530 uses analog optocouplers 555 for measuring output voltage to achieve "coarse" control. This "coarse" control uses linear optocoupler feedback and is fast. As a closed loop system, the supervisory (output sampling and interface) controller 535 measures the output voltage and current precisely, calculates the error in the voltage, and communicates a new set point to compensate for this error digitally. This eliminates the inaccuracy, which would have been introduced in transfer of analog signal using optical isolation due to non-linearities of the optocoupler and its time and temperature drift. Optocouplers 555 are used for digital communication between power supply controller 530 and supervisory controller 535 to achieve fine control through digital communication.

Thus, a slow outer loop which uses digital communication between processors is used to achieve fine control by gradually correcting for the inaccuracy that may have resulted from coarse control through the linear optocoupler. The digital communication based loop with output sampling controller 535 for "fine" control provides precise output (within +/−2% over the entire operating range from 20 V to 5000 V). This form of hybrid feedback control loop has the advantage that it eliminates need for correcting optocoupler linearity and drift issues and the design does not need any calibration.

Figure 6:
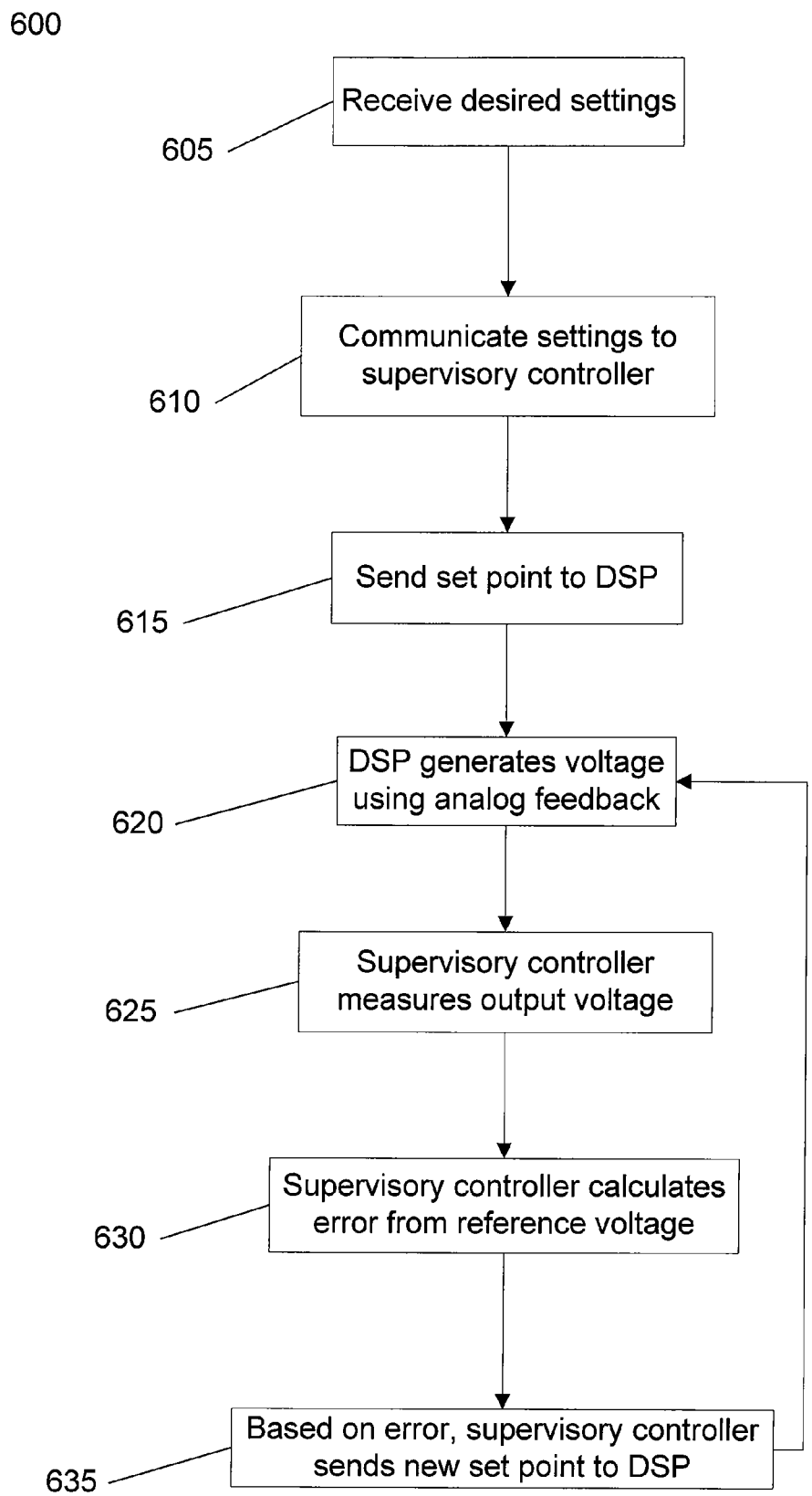
FIG. 6 shows a method of running a power supply utilizing a hybrid feedback loop in accordance with the embodiments of the present invention.

FIG. 6 illustrates a method 600 according to an embodiment of the present invention. In step 605, the desired voltage setting is received from a user. This may be accomplished by user input through a user interface. The user input may also instruct the power supply to "RUN". In step 610, the settings are communicated to supervisory (output sampling and interface) controller 535. In one embodiment, a control board processor, which is running the user interface, handles this communication. The settings include a "set point" value containing the desired voltage.

In step 615, supervisory microcontroller 535 sends a set point value to power supply controller 530, which may be a DSP. The type of digital signals sent from supervisory controller 535 to DSP 530 includes set points which are typically 4 bytes of eight bits each. Additional bytes may be sent as necessary for communicating system fault and status information. Fault codes and other information may be communicated between the processors at any time.

In step 620, DSP 530 generates the required output voltage by using the analog feedback received through the analog optocoupler 555. DSP 530 can regulate the output voltage by controlling the PWM signals to switching circuitry as described above. In one embodiment, the switching circuitry is a combination of a buck converter and a resonant inverter. Due to optocoupler drift and non-linearity, the output voltage is prone to inaccuracy especially when operating over such a large range of 20 to 5000V.

In step 625, to correct the output voltage, supervisory controller 535, which is connected electrically to the output side of the power supply, makes a precision measurement of the output voltage. In step 630, supervisory controller 535 uses a temperature stable precision reference to calculate an error in the output voltage. The error may be obtained by subtraction of the two values, or other more complex equations may be used, including additional terms and operations.

In step 635, depending on the direction of the error in the output voltage as compared to the set point communicated to the DSP, the supervisory controller 535 communicates a new set point to DSP 530 so as to correct for this error. This process goes on continuously and ultimately enables the power supply to achieve a precise output voltage by compensating for analog optocoupler drift and non-linearity.

In this embodiment, the power supply controller never knows that there is any inaccuracy in the output. Supervisory controller 535 modifies the set point and communicates the set point to DSP 530 in order to correct for any inaccuracy. To achieve the new set point, DSP 535 can modify the operating frequency of the inverter or modify the output voltage of the buck converter, where the latter may be done by changing the buck converter PWM duty cycle. At very light loads, DSP 530 may also change the buck converter operating frequency to improve precision.

Figure 7:
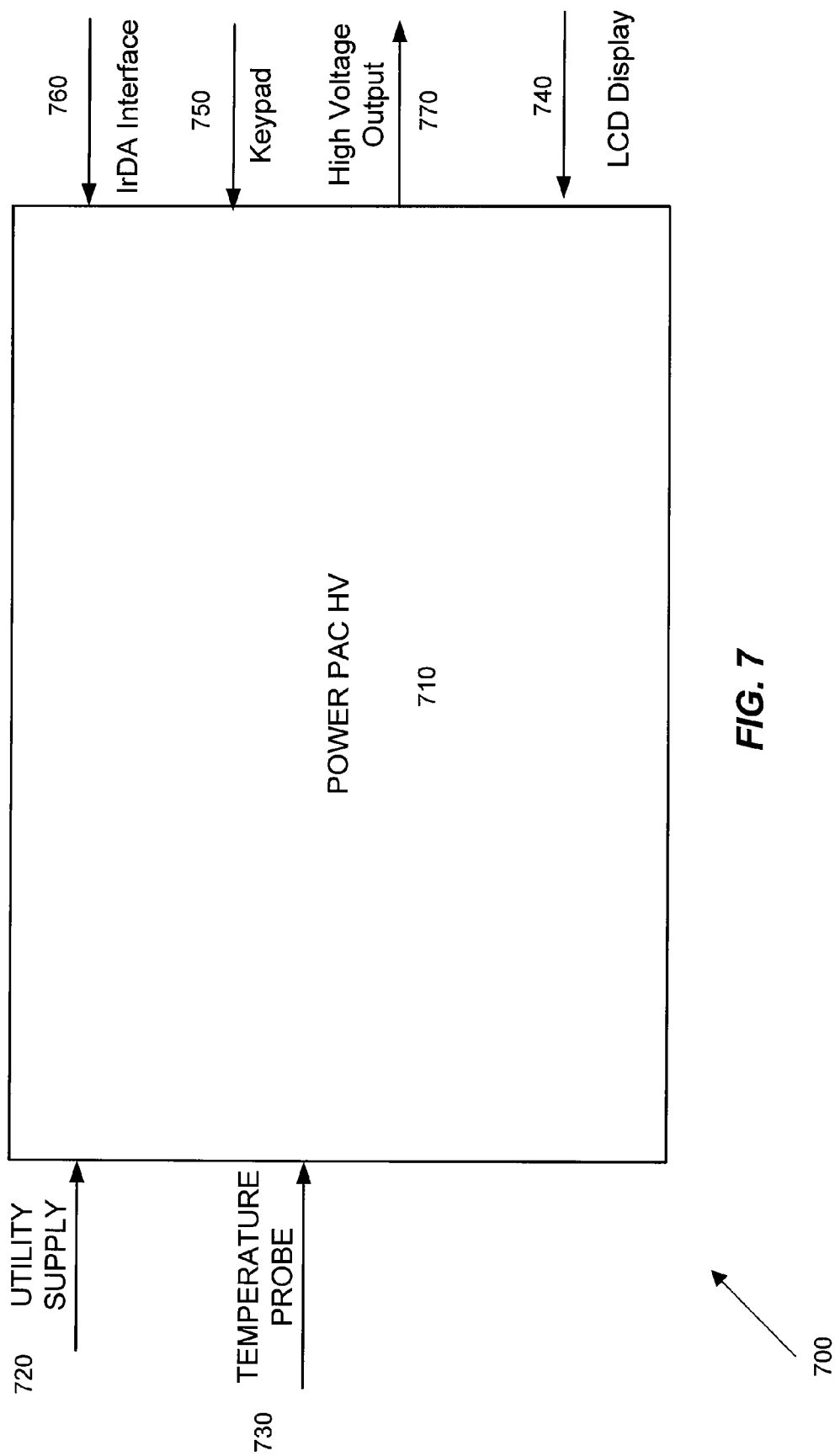
FIG. 7 is an exemplary top-level block diagram of the power supply in accordance with the embodiments of the present invention.

FIG. 7 shows an exemplary top-level block diagram 700 of a power supply in accordance with the embodiments of the present invention. As shown in FIG. 7, a power supply unit 710 receives a utility supply 720 (e.g., 110V 60 Hz/220V 50 Hz) and outputs a high voltage 770. In one embodiment, utility supply 720 is connected through a utility supply cable to the rear side of the power supply unit 710. A temperature probe 730 (used for temperature control mode) may also be connected on the rear side of power supply unit 720. In another embodiment, the front side of power supply unit 710 provides access to output terminals and also provides a user interface using a graphic LCD display 740 and a keypad 750 consisting of several (e.g., 20) keys. The front bezel of the device may also provide the infrared data association ("IrDA") interface 760, where run data can be downloaded.

Figure 8:
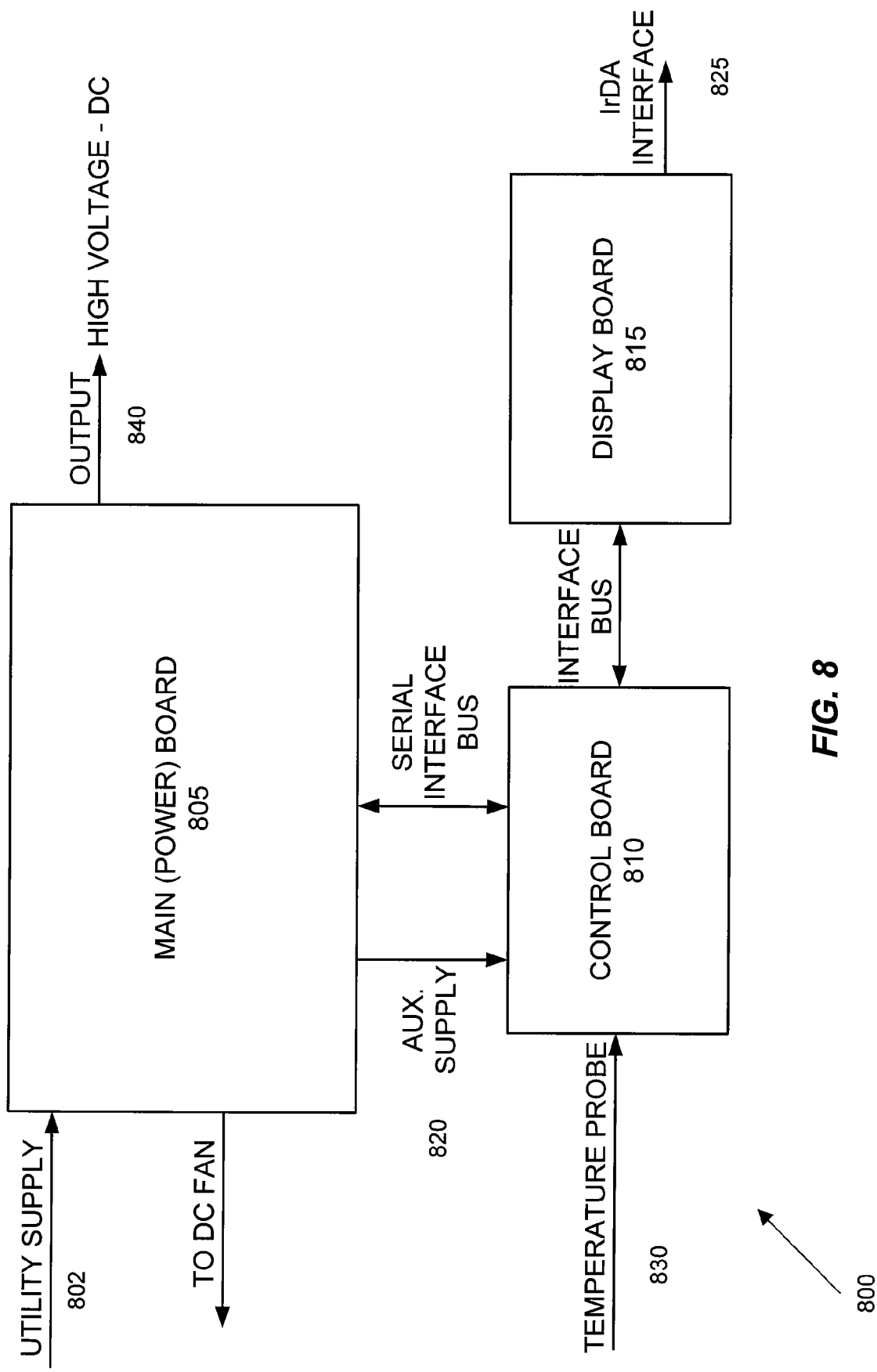
FIG. 8 is a second-level block diagram of the power supply in accordance with the embodiments of the present invention.

FIG. 8 shows a second-level block diagram 800 of the power supply in accordance with the embodiments of the present invention. FIG. 8 shows that in one embodiment, the power supply device includes three circuit boards: a power board 805; a control board 810; and a display board 815.

Power board 805 receives the utility supply 802 using the input socket on the rear side of the unit. An auxiliary supply 820 on the main power board 805 provides power for the operation of the circuitry on power board 805 and also provides operating power to the control board 810 and the display board 815. Power board 805 houses the power conversion circuitry together with the power supply controller and the output sampling and interface controller (supervisory controller). These controllers can communicate with each other using an isolated asynchronous serial communication interface. Critical signals, such as power fail and converter shutdown, are connected between the controllers using an additional optically isolated circuitry.

Control board 810 receives power from auxiliary supply 820 on power board 805. Control board 810 provides regulated voltage and control signals to display board 815 and the IrDA interface 825 on display board 815. An external temperature probe 830 is connected with a control board processor. The user interface firmware resides on the control board processor. When the user programs and executes a run, the user interface controller converts the RUN parameters to set points and communicates them to the sampling controller on main board 810. The sampling controller handles regulation of the output voltage of the power supply and periodically provides output voltage and current measurements to the user interface processor on the control board.

Display board 815 includes the LCD display 740, the keypad 750, and the IrDA transreceiver 760. The display board LCD is controlled by the control board processor. Supervisory microcontroller 135 receives its commands from the control board processor, which runs the user interface consisting of a key pad 750 and LCD display 740.

Since the electronic circuit on the input side, e.g. power supply controller, and the electronic circuit on the output side, e.g. output sampling and interface controller and the control board processor, exchange information such as output voltage and current and command signals, a suitable means of transferring information is necessary. The three processors use digital signals for communication and information transfer that makes the communication robust due to built in error detection and data validation.

Figure 9:
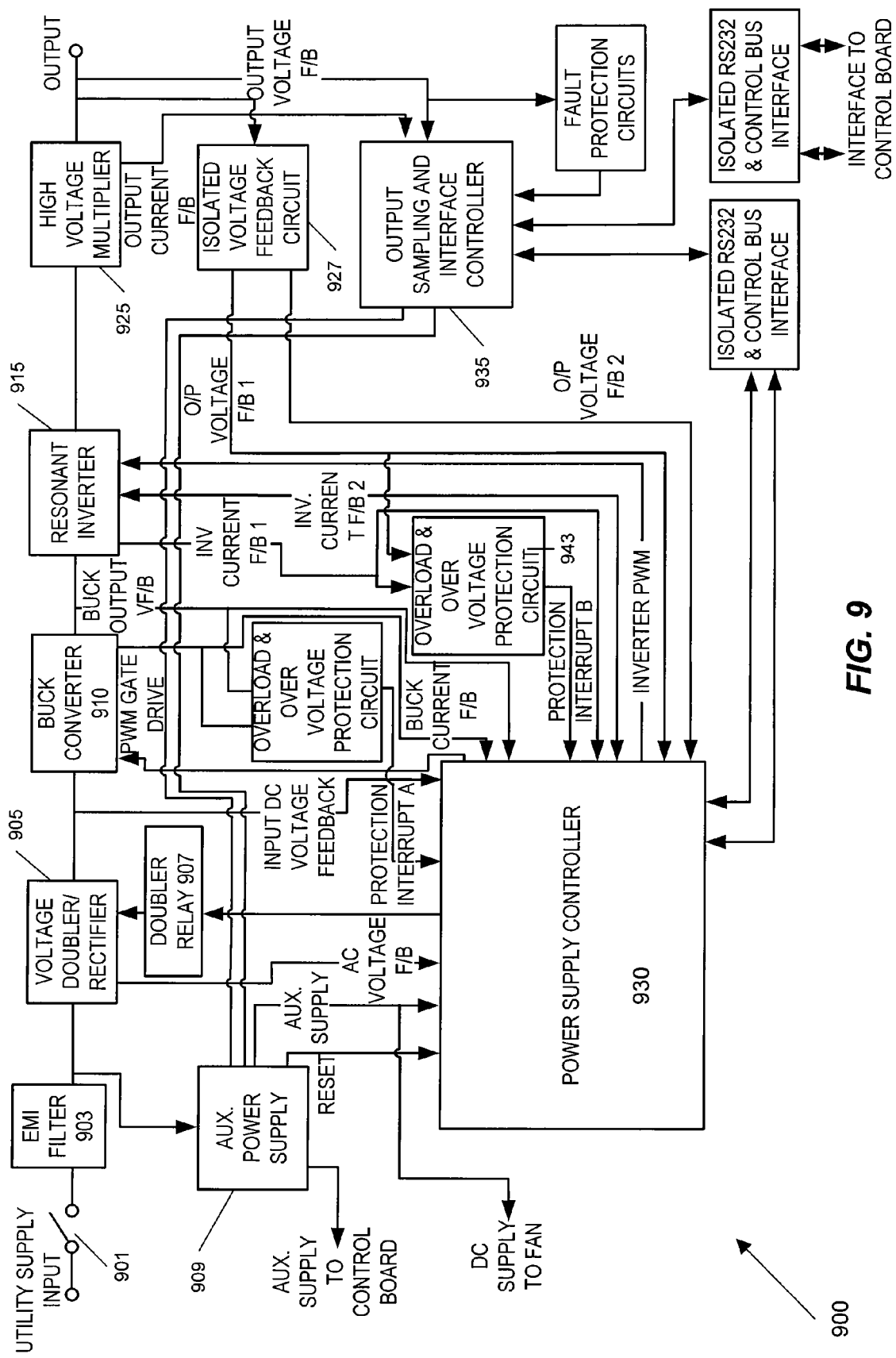
FIG. 9 is a third-level block diagram corresponding to the block diagram of FIG. 8, showing a block diagram for the main board of FIG. 8.

FIG. 9 shows a third-level block diagram 900 corresponding to the main (power) board 805 of FIG. 8. The power board 805 receives its power through the input socket on the rear side of the unit. The input supply can be switched ON and OFF using the power switch 901 connected on the rear side of the unit. The EMI filter 903 filters conducted electromagnetic interference from being coupled to the utility supply. In one embodiment, the voltage doubler rectifier 905 is a full wave rectifier that can be configured as either a full wave bridge rectifier or a full wave doubler rectifier. This change is achieved using a relay which is controlled by the power supply controller 930, which may be a DSP (digital signal processor).

The DSP 930 monitors the input supply voltage using the circuit comprising of several diodes, resistors, and capacitors. When the utility supply is in the acceptable range (e.g., 94-130 VAC or 170-264 VAC) the DSP 930 considers the utility supply as normal and operation of the power supply can then continue. When the supply voltage is outside the acceptable range, the MAINS_FAIL signal is asserted on a pin of the DSP 930 which informs the other processors in the system to go into a shutdown mode.

When the utility supply is in the 94-130 V Range, the doubler relay 907 will turn ON and will remain ON until a utility fail condition is detected. When the DC supply at the output of the rectifier 905 (HVDC+) is found to be below 200 VDC or above 375 VDC, MAINS_FAIL condition is detected. The MAINS_FAIL signal is asserted each time MAINS_FAIL condition is detected and its state is changed once the utility supply is detected as normal.

The auxiliary power supply 909 provides three independent isolated power supplies which are used by the following circuits, namely the power supply controller 930 and associated circuits; the output sampling and interface controller 935 and associated circuits; and the control board and display board. The secondary regulators at the output of the isolated outputs of the auxiliary power supply 909 also provide a power-ON RESET signal to the microprocessors in the unit.

The next stage after the doubler rectifier 905 is the buck converter stage 910. In one embodiment, buck converter 910 is a fixed frequency stage, and in other embodiments the frequency may change. Additionally, the operation frequency of a resonant inverter may depend on the on the output voltage of the buck converter. The power supply controller (or the DSP) 930 provides the necessary PWM gate drive signals to buck converter 910. The output and input voltage of the buck converter 910 and the current flowing through the buck converter power elements are measured using necessary circuits and are sampled by the DSP 930 periodically. These sampled values are used by the algorithm running on the DSP 930 to adjust the PWM duty cycle continuously. In case of a fault resulting in excessive voltage at the output of the buck converter 910 or excessive current through the switching elements in the buck converter 910, the protection interrupt, a signal input to the DSP 930, causes the PWM signals to be turned OFF.

The next stage in the power train is the resonant inverter 915. In one embodiment, the resonant inverter 915 is a half-bridge variable frequency stage which converts the DC voltage supplied by the buck converter 915 into a high frequency waveform. The output of resonant inverter 915 is coupled to the next stage using a high frequency transformer (not shown). The output of the transformer is rectified by a multiplying-rectifier 925 to produce a high DC voltage.

The PWM signals for resonant inverter 915 circuit power MOSFETs are also generated by the power supply controller 930. The inverter circuit current (INV CURRENT F/B 1) and output voltage feedback (O/P VOLTAGE F/B1) signals are sampled by the power supply controller 930 and the PWM signals are adjusted continuously as necessary to ensure stable output voltage. The inverter overload and protection circuits 943 can shutdown the PWM signals in case of a fault. The isolated voltage feedback circuit 927 provides an isolated voltage signal proportional to the output voltage to the DSP 930. The DSP 930 controls the inverter PWM to correct for any changes in this voltage.

On the output side of the power supply, a dedicated output sampling and interface controller 935 is used to monitor the output voltage and current. Additional protection circuits on the output such as the arc detection circuit and the GND leak detection circuit inform the sampling controller 935 of a fault condition should a fault get generated. Sampling processor 935 on the output side has two isolated RS 232 interface. One of the interfaces is used to communicate with the DSP 935. The second interface is used to communicate with the control board.

The control board uses the RS-232 interface to provide sampling processor 935 of the set point at which the power supply is expected to operate. DSP 930 and the sampling processor 935 have dedicated joint test action group ("JTAG") ports which can be used for programming the part. This port is used for production programming as well as any field upgrades. Optocouplers are on the control board for digital communication between control board processor and the sampling controller 935 on the main board.

Figure 10:
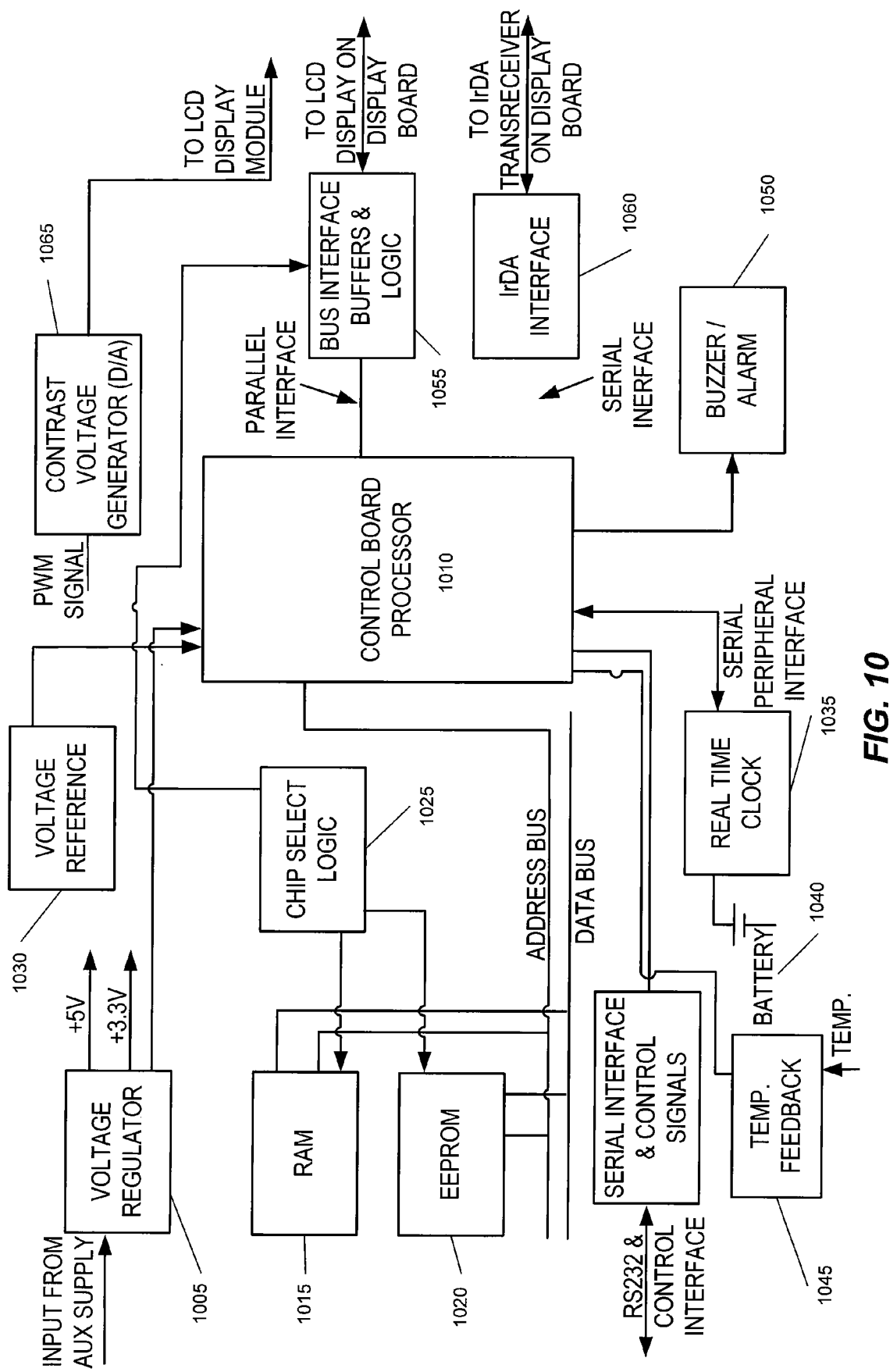
FIG. 10 is a third-level block diagram corresponding to the block diagram of FIG. 8, showing a block diagram for the control board of FIG. 8.

FIG. 10 shows a third-level block diagram corresponding to the control board 810 of FIG. 8. A voltage regulator 1005 regulates the input supply voltage and provides regulated 5V and 3.3V supply for the control board and the display board. Voltage regulator 1005 also generates the RESET signal which is used to reset the control board processor 1010 at power ON.

Processor 1010 on the control board drives the user interface display and key pad and communicates the set point to the sampling processor on the main board. This microprocessor 1010 is the overall supervisor for the operation of the unit and translates the user's set points to commands that can be understood by the sampling processor. The RAM 1015 and EEPROM 1020 are used by processor 1010 to store data. The chip-select logic 1025 is used for selecting the appropriate device on the board with which microprocessor 1010 is communicating at any given time. A JTAG interface is used for programming the microprocessor during manufacturing and for any subsequent field upgrades.

The voltage reference 1030 is used by processor 1010 to accurately measure the voltage signal from the external temperature probe. The real time clock 1035 is a serial peripheral and is used by processor 1010 to keep track of time/calendar. Real time clock 1035 has a battery backup 1040 to maintain its operation in case of failure of supply from the voltage regulator 1005 once the power supply device is switched OFF.

The temperature feedback conditioning circuit 1045 is a low pass filter used to eliminate any noise on the temperature probe signal. A buzzer 1050 is used to signal fault conditions that may be the result of a fault or inappropriate use. The bus buffers 1055 are used to communicate with the LCD display on the display board. The IrDA interface 1060 is a serial to IR converter and is used by microprocessor 1010 to drive the IR trans-receiver on the display board.

The LCD contrast voltage generator 1065 is a single bit D/A converter circuit which is used to generate the contrast control signal for the LCD on the display board. The pulse width of the pulse that is input into generator 1065 is modulated so as to change the contrast voltage by the microprocessor. Diagnostic LEDs are used by processor 1010 to indicate fault conditions and display operating status.

Figure 11:
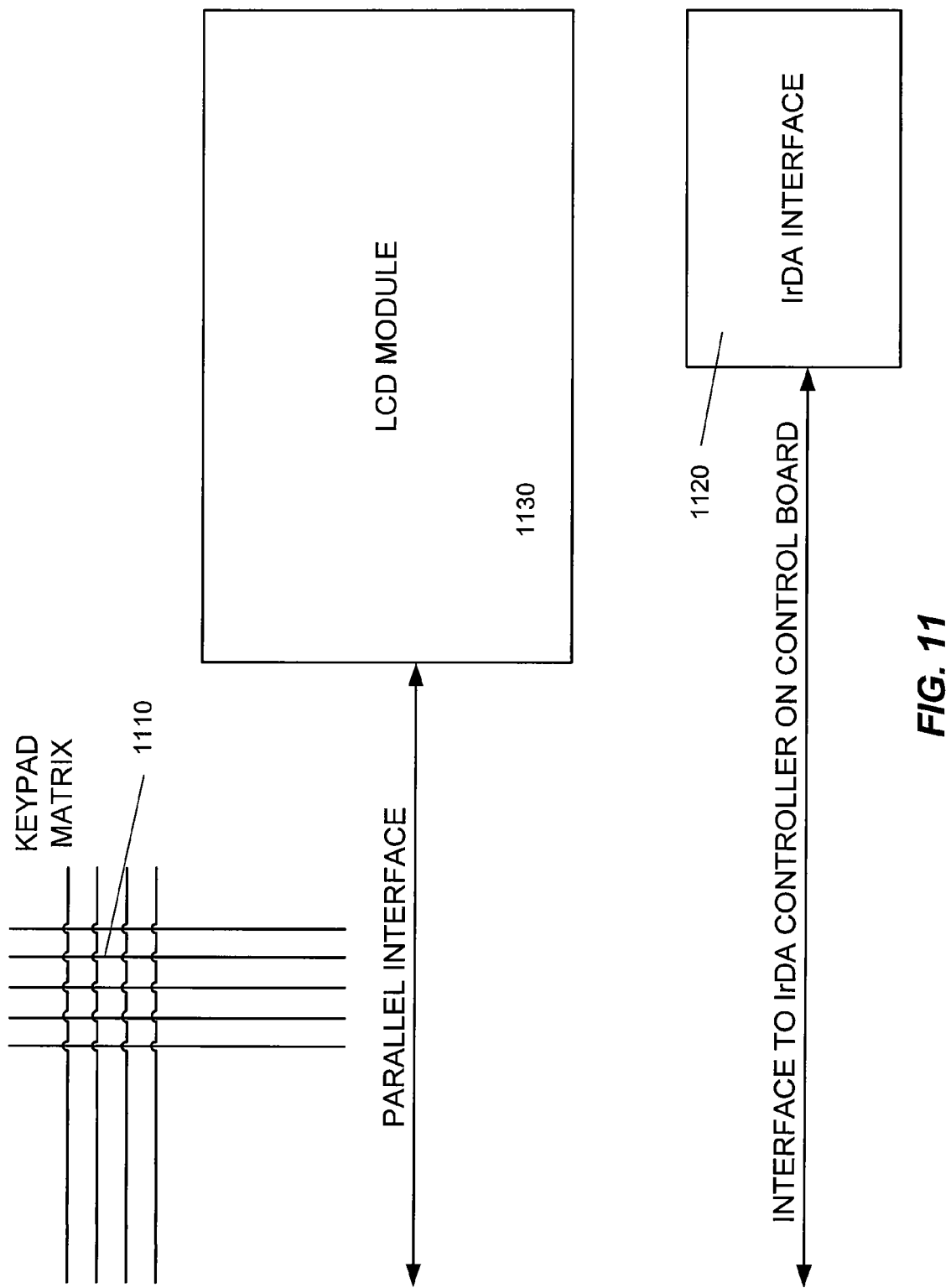
FIG. 11 is a third-level block diagram corresponding to the block diagram of FIG. 8, showing a block diagram for the display board of FIG. 8.

FIG. 11 shows a third-level block diagram corresponding to the display board 815 of FIG. 8. As shown in FIG. 11, the keypad matrix 1110 on the display board is used to detect a key press. Each key has a dedicated function. The IrDA transreceiver/interface 1120 is used to communicate with an external IR device for transfer of data/methods. LCD display module 1130 is used to display data and controls to a user.

Embodiments of the present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and equivalents within the scope of the following claims.

What is claimed is:

1. A wide range power supply device for protein electrophoresis, isoelectric focusing and electrophoretic blotting, comprising:
    a power conversion stage, having
        an input rectifier connected with a utility supply;
        a dc/dc converter connected with the input rectifier;
        a resonant inverter connected with the dc/dc converter;
        a transformer connected with the resonant inverter; and
        a voltage multiplier connected with the transformer and connected with an output voltage of the wide range power supply device;
    a power supply controller operatively coupled with the dc/dc converter and the resonant inverter, wherein the power supply controller is coupled with the output voltage via one or more feedback loops; and
    a supervisory controller operatively coupled with the power supply controller, wherein the coupling is accomplished with an optically isolated digital interface.

2. The wide range power supply device of claim 1, wherein the transformer has one secondary winding.

3. The wide range power supply device of claim 1, wherein the voltage output from the power supply varies from 20V to 5000V.

4. The wide range power supply device of claim 1, wherein the supervisory controller is part of one of the feedback loops.

5. The wide range power supply device of claim 4, wherein the supervisory controller sends a digital signal to the power supply controller, wherein the digital signal includes information as to an error in the output voltage.

6. The wide range power supply device of claim 5, wherein the information includes a new voltage setting for the power conversion stage.

7. The wide range power supply device of claim 1, further comprising an analog optocoupler, wherein the analog optocoupler is part of an analog feedback loop from the output voltage to the power supply controller.

8. The wide range power supply device of claim 1, wherein the dc/dc converter is a buck converter.

9. The wide range power supply device of claim 1, wherein the resonant inverter is a quasi-resonant inverter.

10. The wide range power supply device of claim 9, wherein the quasi resonant inverter is a half-bridge design.

11. The wide range power supply device of claim 1, wherein the voltage multiplier also acts as a rectifier of a signal from the transformer.

12. A method for controlling an output voltage of a switched-mode power supply, comprising:
    receiving a first set point at a power supply controller, wherein a set point includes an output voltage setting;
    generating the output voltage via control signals sent by the power supply controller to a power conversion stage, wherein an input of the power conversion stage is galvanically isolated from the output voltage;
    measuring the output voltage with a supervisory controller;
    calculating, with the supervisory controller, an error in the output voltage using the output voltage and a reference voltage,
    transmitting a digital signal from the supervisory controller to the power supply controller based on the error, wherein the supervisory controller is galvanically isolated from the power supply controller; and
    altering the control signals based on the digital signal.

13. The method of claim 12, further comprising:
    receiving the first set point at a control board processor;
    sending the first set point to the supervisory controller; and
    digitally sending the first set point to the power supply controller.

14. The method of claim 12, wherein the control signals are PWM signals.

15. The method of claim 12, wherein the digital signal is transmitted through a digital optocoupler, wherein the digital optocoupler provides galvanic isolation between the power supply controller and supervisory controller.

16. The method of claim 12, further comprising:
    transmitting, via an analog signal, the output voltage to the power supply controller;
    using the analog signal in a feedback loop to alter the control signals to the power conversion stage.

17. The method of claim 16, wherein the digital signal includes a second set point.

18. The method of claim 16, wherein the analog signal is transmitted through a linear optocoupler, wherein the linear optocoupler provides galvanic isolation between the output of the power supply and the power supply controller.

19. A wide range power supply device, comprising:
a power conversion stage;
a power supply controller operatively coupled with the power conversion stage, wherein the power supply controller is coupled with an output voltage of the wide range power supply via one or more feedback loops; and
a supervisory controller operatively coupled with said control processor, wherein the coupling is accomplished with an optically isolated digital interface, wherein the supervisory controller is part of one of the feedback loops.

20. The wide range power supply device of claim 19, wherein the supervisory controller sends a digital signal to the power supply controller, wherein the digital signal includes information as to an error in the output voltage.

21. The wide range power supply device of claim 20, wherein the information includes a new voltage setting for the power conversion stage.

* * * * *

UNITED STATES PATENT AND TRADEMARK OFFICE
CERTIFICATE OF CORRECTION

PATENT NO. : 7,324,354 B2
APPLICATION NO. : 11/428948
DATED : January 29, 2008
INVENTOR(S) : Rahul Joshi et al.

It is certified that error appears in the above-identified patent and that said Letters Patent is hereby corrected as shown below:

In claim 19, column 15, line 9, please delete "control processor" and insert --power supply controller--.

Signed and Sealed this
Twelfth Day of July, 2011

David J. Kappos
*Director of the United States Patent and Trademark Office*